United States Patent [19]
Uemura

[11] Patent Number: 5,825,021
[45] Date of Patent: Oct. 20, 1998

[54] APPARATUS FOR DETECTING THAT A FLYING OBJECT HAS PASSED A MONITORING SPACE

[75] Inventor: Toshimi Uemura, Tokyo, Japan

[73] Assignee: NEC Corporation, Tokyo, Japan

[21] Appl. No.: 806,476

[22] Filed: Feb. 26, 1997

[30] Foreign Application Priority Data

Feb. 28, 1996 [JP] Japan .................................... 8-040222

[51] Int. Cl.$^6$ ...................................................... G01S 13/06
[52] U.S. Cl. .......................... 250/222.1; 342/33; 342/463
[58] Field of Search ................................ 250/222.1, 221, 250/203.1, 203.6, 206.1, 206.2, 208.2, 208.3; 342/33, 34, 35, 46, 47, 463

[56] References Cited

U.S. PATENT DOCUMENTS

| | | | |
|---|---|---|---|
| 5,144,315 | 9/1992 | Schwab et al. | 342/463 |
| 5,407,149 | 4/1995 | Singhal | 250/222.1 |

FOREIGN PATENT DOCUMENTS

| | | |
|---|---|---|
| 2287900 | 11/1990 | Japan . |
| 572317 | 3/1993 | Japan . |

*Primary Examiner*—Edward P. Westin
*Assistant Examiner*—Kevin Pyo
*Attorney, Agent, or Firm*—Sughrue, Mion, Zinn, Macpeak & Seas, PLLC

[57] ABSTRACT

Plural light emitting device groups are arranged in the direction perpendicular to the center line of a runway and each of them comprises plural light emitting devices different in light emitting angle from one another. A first controller controls said plural light emitting device groups so that light emitting devices having the same light emitting angle may emit light at the same time and light emitting devices having different light emitting angles may emit light one after another. Plural light receiving device groups are arranged, respectively, so as to correspond to the plural light emitting devices and which receive reflected light from a flying object passing a monitoring space. A second controller controls said plural light receiving device groups so that light receiving devices which receive the reflected lights corresponding to the lights emitted from said light emitting devices having the same light emitting angle as each other may be operated at the same time and light receiving devices which receive the reflected light corresponding to the lights emitted from said light emitting devices having different light emitting angles from each other may be operated one after another. A detector outputs a passing detection signal to show that said flying object has passed said monitoring space when at least one of said plural light receiving devices has received a reflected light from said flying object.

15 Claims, 10 Drawing Sheets

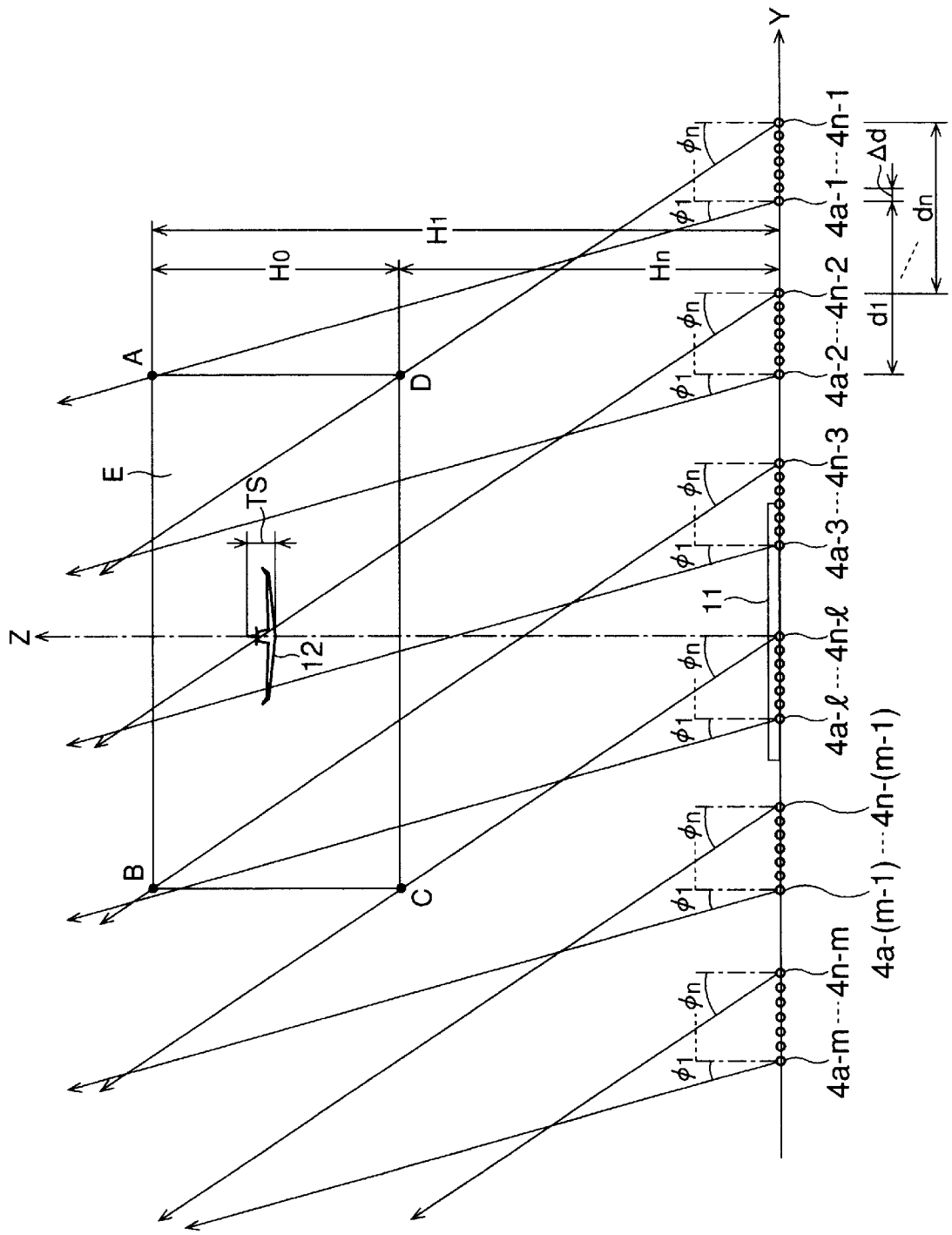

APPARATUS FOR DETECTING THAT A FLYING OBJECT HAS PASSED A MONITORING SPACE

BACKGROUND OF THE INVENTION

1. Field of the Invention

The present invention relates to an apparatus for detecting that a flying object has passed a monitoring space (hereinafter referred to as a monitoring space passing detecting apparatus), and particularly to a monitoring space passing detecting apparatus which detects that a flying object has passed a monitoring space and transmits the detected information to the flying object, when performing a landing guidance for the flying object such as an aircraft and the like.

2. Description of the Related Art

In an conventional landing guidance system for an aircraft, a global positioning system (hereinafter referred to as GPS) receiver is used as a distance measuring system as disclosed in a Japanese laid-open publication No.2-287900. And the system makes it possible for an aircraft to perform a complicated approach/landing such as a segmented approach, a curved approach or the like by means of a microwave landing system (hereinafter referred to as MLS), using precise distance data obtained from a GPS receiver.

Referring to FIG. 1, in the conventional landing guidance system disclosed in the Japanese laid-open publication No.2-287900, an MLS signal received by an antenna 71 is reception-processed by an MLS receiver 72 and is converted into such parameter data as angle measurements, namely, an azimuth angle and an elevation angle, and an antenna position of a ground station, and then supplied to a navigation computer 73. On the other hand, a GPS signal received by a GPS antenna 77 is reception-processed by a GPS receiver 76, and a receiving point, namely, the position of an aircraft is measured, and the distance from the aircraft to its landing point is computed on the basis of the measured position data and pre-inputted position data of the landing point on a runway, and the computed distance is supplied to the navigation computer 73 as distance data.

The navigation computer 73 computes the position of the aircraft and computes a deviation of its position from a specified approaching path on the basis of such parameter data as a measured azimuth angle value, a measured elevation angle value, an antenna position of a ground transmitter, and an azimuth angle and an elevation angle of the approaching path, and the distance data supplied from the GPS receiver 76. The deviation information is divided into the horizontal and vertical components in relation to a specified path and a distance to the landing point and is displayed on a navigation indicator 74.

A horizontal situation indicator (HSI) or an electronic horizontal indicator (EHSI) capable of performing a display in the form of a map is used as the navigation indicator 74.

In case of an automatic-pilot control, an autopilot 75 receives deviation data and distance data from the navigation computer 73 and computes a rudder angle necessary for an automatic-pilot control of an aircraft and a control signal necessary for controlling an aileron.

In another conventional landing guidance system disclosed in a Japanese laid-open publication No.5-72317, a positioning error of a GPS is computed by a GPS receiver and a computing apparatus provided on a ground system, and the positioning error information is transmitted to an in-aircraft system by means of an existing communication means. The aircraft obtains an exact distance information at any time by correcting a positioning error obtained by a GPS receiver provided on the in-aircraft system by means of a positioning error information transmitted from the ground system.

Referring to FIG. 2, this conventional landing guidance system is composed of a ground system 80 and an in-aircraft system 90. The ground system 80 is composed of a GPS receiver 81, a computing apparatus 82 and an MLS ground station 83, and the in-aircraft system 90 is composed of an MLS antenna 91, an MLS receiver 92, a navigation computer 93, a navigation indicator 94, an autopilot 95, a GPS receiver 96, and a GPS antenna 97.

The GPS receiver 81 on the ground obtains position data of the ground system 80 by receiving a signal from a GPS satellite (not illustrated). The computing apparatus 82 compares the position data with the pre-stored actual position data of the ground system 80, and transmits a difference between them to the MLS ground station 83 as a positioning error information.

This positioning error information is used as the respective deviation information in relation to latitude, longitude, height, and the like, and is converted into a specified format as a word of MLS auxiliary data in the MLS ground station 83, and then is sent out within the MLS domain.

On the other hand, in the in-aircraft system 90, the MLS receiver 92 processes a signal which has been transmitted from the ground system 80 and received by the MLS antenna 91, and outputs deviation information of the received azimuth angle deviated from a reference azimuth angle and that of the received elevation angle deviated from a reference elevation angle, and auxiliary data. The deviation data and auxiliary data outputted from the MLS receiver 92 are inputted into the navigation computer 93. And the position data for representing its own aircraft position obtained by the GPS receiver 96 through the GPS antenna 97 are also inputted into the navigation computer 93. The navigation computer 93 compensates the position data supplied from the GPS receiver 96 of the in-aircraft system 90 with a positioning error information, namely, a deviation information and auxiliary data, and outputs its own exact aircraft position to the navigation indicator 94. An automatic-pilot control is performed by sending data from the navigation computer 93 to the autopilot 95.

In the above-mentioned existing landing guidance system for an aircraft, the system makes it possible for an aircraft to perform a complicated approach and landing such as a segmented approach, a curved approach or the like by combining an MLS with a GPS receiver which is higher in accuracy of a distance measurement and lower in cost in comparison with an existing distance measuring equipment (DME) or a precision distance measuring equipment (DME/P).

Now, the technical standards of "International Civil Aviation Organization (ICAO) Annex 10" prescribe that the descending path of an aircraft should be set within a range of 15 m to 18 m above the end of a runway.

And the course width of the descending path is prescribed to be 210 m in the direction perpendicular to the center line of a runway at the end of the runway. That is to say, after an aircraft has passed a space of 15 m to 18 m in vertical plane width and of 210 m in horizontal plane width above the end of a runway, it raises up its fuselage which has been nosing down and comes into a slightly nose-up posture for horizontal landing or main ground gear landing. Namely, a flare-out operation is started. Therefore, the above-mentioned specified space composed of said vertical plane width and said horizontal plane width is an important position for an aircraft which has come into a final landing posture to judge the beginning of a fare-out operation. The specified space is treated as a monitoring space in the following.

In case of detecting the monitoring space by means of a GPS used in a landing guidance system as described above, a positioning accuracy obtained by a GPS receiver is several ten meters in Clear and Acquisition Code, and is several meters even in case of using Precision Code or a differential GPS mode.

On the other hand, a system error obtained by an MLS receiver is ±6 m in the horizontal direction, and is ±0.6 m in the vertical direction. Accordingly, an error of height from the ground surface obtained from elevation angle data obtained by the MLS receiver and distance data from the landing point to the own aircraft obtained by the GPS receiver becomes several meters. Therefore, in case of using a GPS only, a detecting accuracy of several centimeters or less in both the horizontal and vertical directions necessary for detecting an aircraft passing the specified space cannot be obtained.

SUMMARY OF THE INVENTION

An object of the present invention is to provide a monitoring space passing detecting apparatus for making it possible to detect in an instant that a flying object has passed a specified space.

Another object of the invention is to provide a monitoring space passing detecting apparatus for making it possible to detect in an instant that a flying object has passed a specified space and transmit the passing information to the aircraft.

Furthermore, another object of the invention is to provide a monitoring space passing detecting apparatus for making it possible to prevent an erroneous operation caused by an external disturbing light when detecting that a flying object has passed a specified space.

In order to attain the above-mentioned objects, a monitoring space passing detecting apparatus comprises plural light emitting device groups including plural light emitting devices which are arranged in the direction perpendicular to the center line of a runway and whose light emitting angles are different from one another; a first controller for controlling said plural light emitting device groups so that light emitting devices having the same light emitting angle as each other included, respectively, in said plural light emitting device groups may emit light at the same time and light emitting devices having different light emitting angles from one another included, respectively, in said plural light emitting device groups may emit light one after another; plural light receiving device groups including plural light receiving devices which are arranged, respectively, so as to correspond to said plural light emitting devices included, respectively, in said plural light emitting device groups and which receive the reflected lights by reflection of the lights emitted from said plural light emitting devices on a flying object passing a monitoring space set in advance; a second controller for controlling said plural light receiving device groups so that light receiving devices which receive the reflected lights corresponding to the lights emitted from the light emitting devices having the same light emitting angle as each other may be operated at the same time and light receiving devices which receive the reflected lights corresponding to the lights emitted from the light emitting devices having different light emitting angles from one another may be operated one after another; and a detector for outputting a passing detection signal which shows that said flying object has passed said monitoring space when at least one of said plural light receiving devices has received the reflected light.

BRIEF DESCRIPTION OF THE DRAWINGS

The above and other objects, features and advantages of the present invention will become more apparent from the following detailed description taken with the accompanying drawings in which:

FIG. 6 is a sectional view showing arrangement of light emitting device groups according to the embodiment of the invention.

DETAILED DESCRIPTION OF THE PREFERRED EMBODIMENTS

Figure 1:
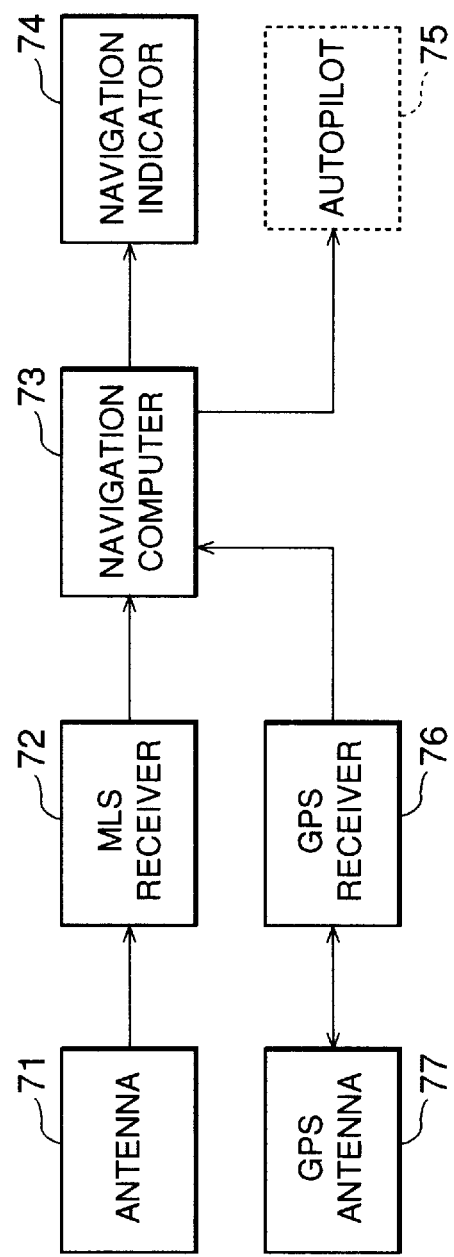
FIG. 1 is a figure showing composition of an conventional landing guidance system.
Figure 2:
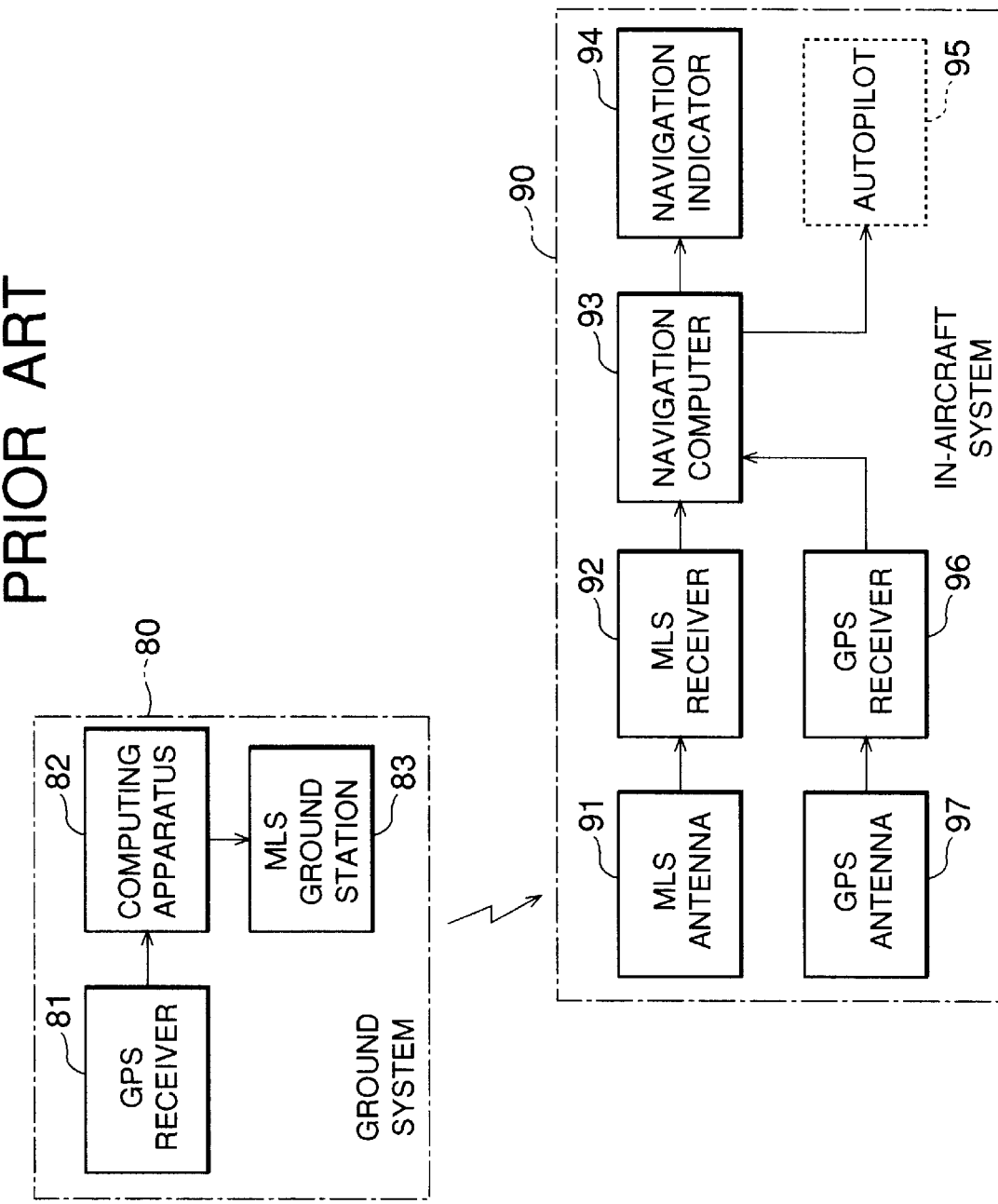
FIG. 2 is a figure showing composition of another conventional landing guidance system.

A preferable embodiment of the present invention is described in the following.

In this embodiment, plural light emitting device groups each of which is composed of plural light emitting devices having light emitting angles of ø1 to øn so as to cover, from the upper limit to the lower limit, monitoring spaces intermittently or consecutively set in advance so as to include at least the lowest approach height above a landing approach path for an aircraft are arranged in the direction perpendicular to an extension line of the center line of a runway. When plural light receiving devices arranged so as to correspond to the plural light emitting devices receive the reflected lights given by that some of pulse-modulated lights emitted from the plural light emitting devices each of which has a light emitting angle of ø1 and which are respectively included in the plural light emitting device groups are reflected on the airframe of an aircraft passing the upper limit of the monitoring space, outputs of optical receivers corresponding to the light receiving devices which have received the reflected lights are increased. Then, output of a comparator monitoring output of the optical receiver is reversed and an OR circuit to take the OR of outputs of the respective comparators outputs a detection signal to show that the aircraft has passed the upper limit of the monitoring space.

In the same way as this, when plural light receiving devices arranged so as to correspond to the plural light emitting devices receive the reflected lights given by that some of pulse-modulated lights emitted from the plural light emitting devices each of which has a light emitting angle of øn and which are included in the plural light emitting device groups are reflected on the airframe of an aircraft passing the lower limit of the monitoring space, outputs of optical receivers corresponding to the light receiving devices which have received the reflected lights are increased. Then, output of a comparator monitoring output of the optical receiver is reversed and the OR circuit to take the OR of outputs of the respective comparators outputs a detection signal to show that the aircraft has passed the lower limit of the monitoring space.

The light emitting angles ø1 to øn are set in advance at the respective values obtained by dividing the vertical width from the upper limit to the lower limit of the monitoring space so as not to cause omission of detection of an aircraft. Thanks to that light emitting angles of plural light emitting device included in plural light emitting device groups are set at these light emitting angles ø1 to øn, the monitoring space can be electronically scanned from the upper limit to the lower limit at a proper speed.

And arrangement of the light receiving device groups is geometrically computed and set in advance so that omission of detection may not happen for an acceptable inclination of an aircraft at the time of a landing approach which inclination is prescribed in the technical standards of ICAO Annex 10. And light receiving devices having wide beam width are adopted so as to receive reflected lights by diffuse reflection from an aircraft.

Furthermore, these light receiving devices are controlled so that only a pulse modulator group and a pulse receiver group in which pulse modulators and pulses receivers, respectively, are paired with each other may operate in order to prevent an erroneous operation caused by an external disturbing light. Said detected result, namely, the information of detecting that an aircraft has passed the upper or the lower limit of the monitoring space is transmitted to the aircraft at an instant by a transmitter.

Accordingly, if a specified space composed of the product of a horizontal width and a vertical width including the main positions such as the lowest approach height (decision height), a reference datum, a flare-out height, a decrab height, and the like is set as a monitoring space on a landing approach path to be monitored as described above and such specified spaces are intermittently or consecutively formed, then it is possible to transmit in an instant a monitoring space passing information to the aircraft and compensate for accuracy of a three-dimensional measurement by a GPS with that information, and therefore, a high-category approach by means of a GPS can be performed under a bad weather. Here, a reference datum means a point at a specified height [15 m (50 ft)+3 m (10 ft)] located above the intersection of the runway center line and the threshold and through which the downward extended straight portion of the instrument landing system (ILS) glide path passes. And a flare-out means an operation of raising up an airframe which has been descending in a nose-down posture for landing, and making the airframe assume a slightly nose-up posture for a horizontal landing or for the main ground gear to touch the ground. And a height where this operation is started is called a flare-out starting height. A decrab operation means a pilot operation of directing the nose of an aircraft just toward the runway direction immediately before touching the ground surface, although the aircraft continues to descend ordinarily as keeping its nose directed toward the wind in case that the aircraft attempts to land as receiving a side wind. And a height where this operation is started is called a decrab starting height.

Next, a monitoring space passing detecting apparatus according to an embodiment of the invention is described in detail with reference to the drawings.

Referring to FIGS. 3 to 6, a monitoring space passing detecting apparatus of this embodiment is provided with a pulse generator 1, a switcher 2 comprising plural gate circuits 2a to 2n, a pulse modulator 3 comprising plural pulse modulators 3a to 3n, a light emitter 4 comprising plural light emitting device groups 4a to 4n, a light receiver 5 comprising plural light receiving device groups 5a to 5n, an optical receiver 6 comprising plural optical receivers 6a to 6n, a detector 7 comprising plural OR gate circuits 7a to 7n, a gate scanning controller 8, and a transmitter comprising a transmitter 9 and an antenna 10.

Figure 3:
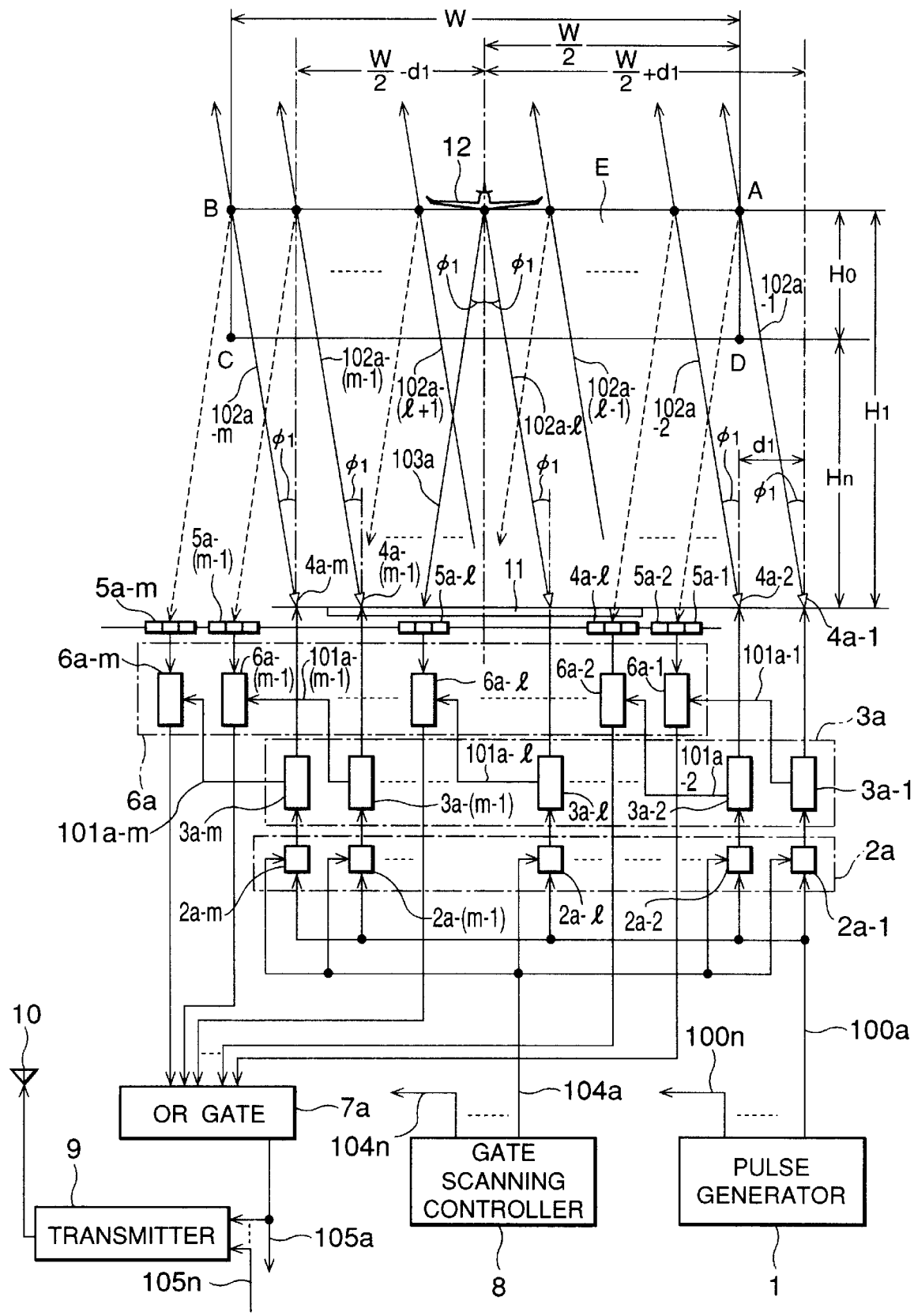
FIG. 3 is a schematic view showing a monitoring space passing detecting apparatus according to an preferred embodiment of the invention.

As shown in FIG. 3, a monitoring space E has the upper limit defined by a line segment AB and the lower limit defined by a line segment CD. And the monitoring space E is defined in size by a horizontal width W and a vertical width H0.

Figure 4:
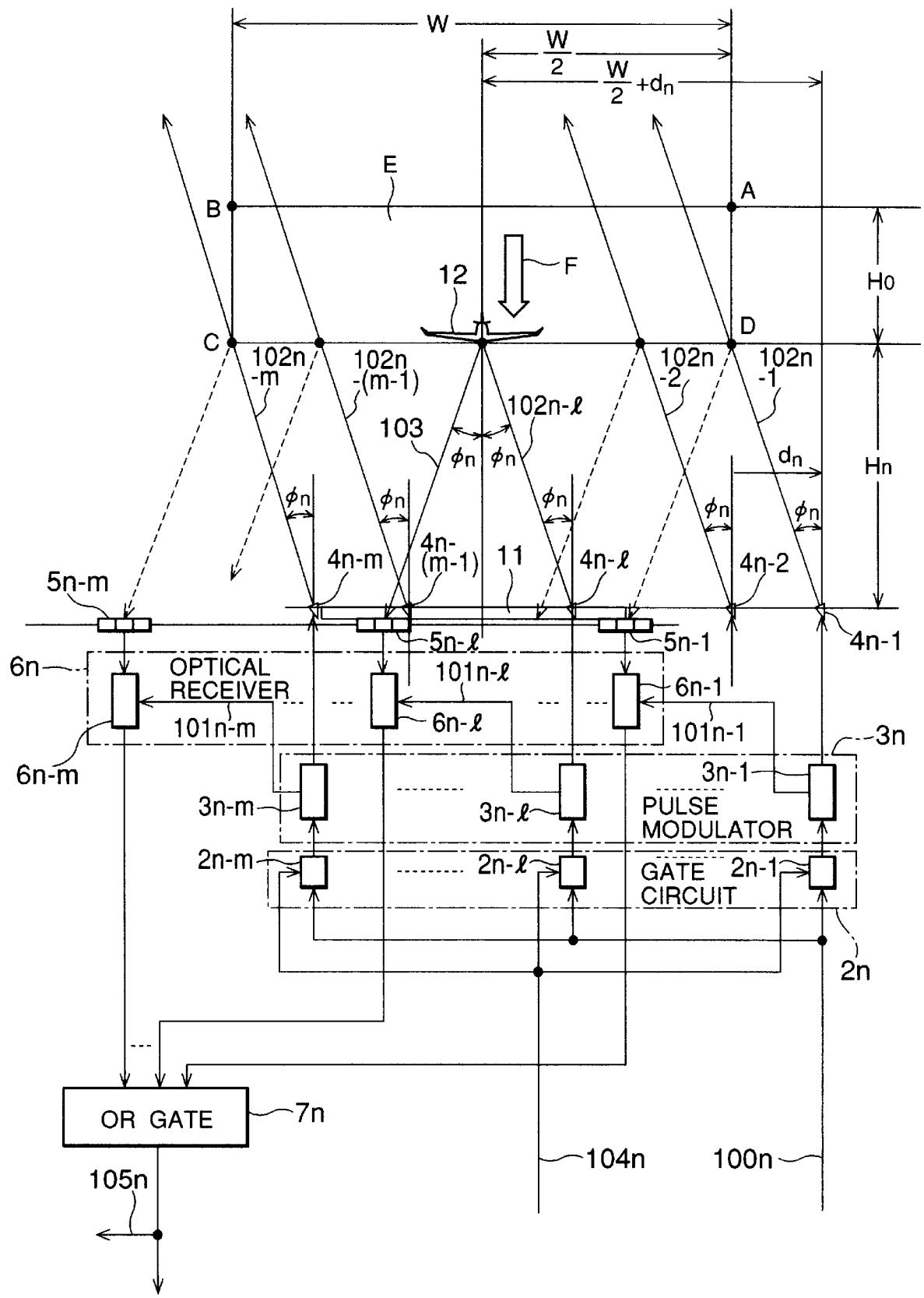
FIG. 4 is a schematic view showing the embodiment of the invention.
Figure 5:
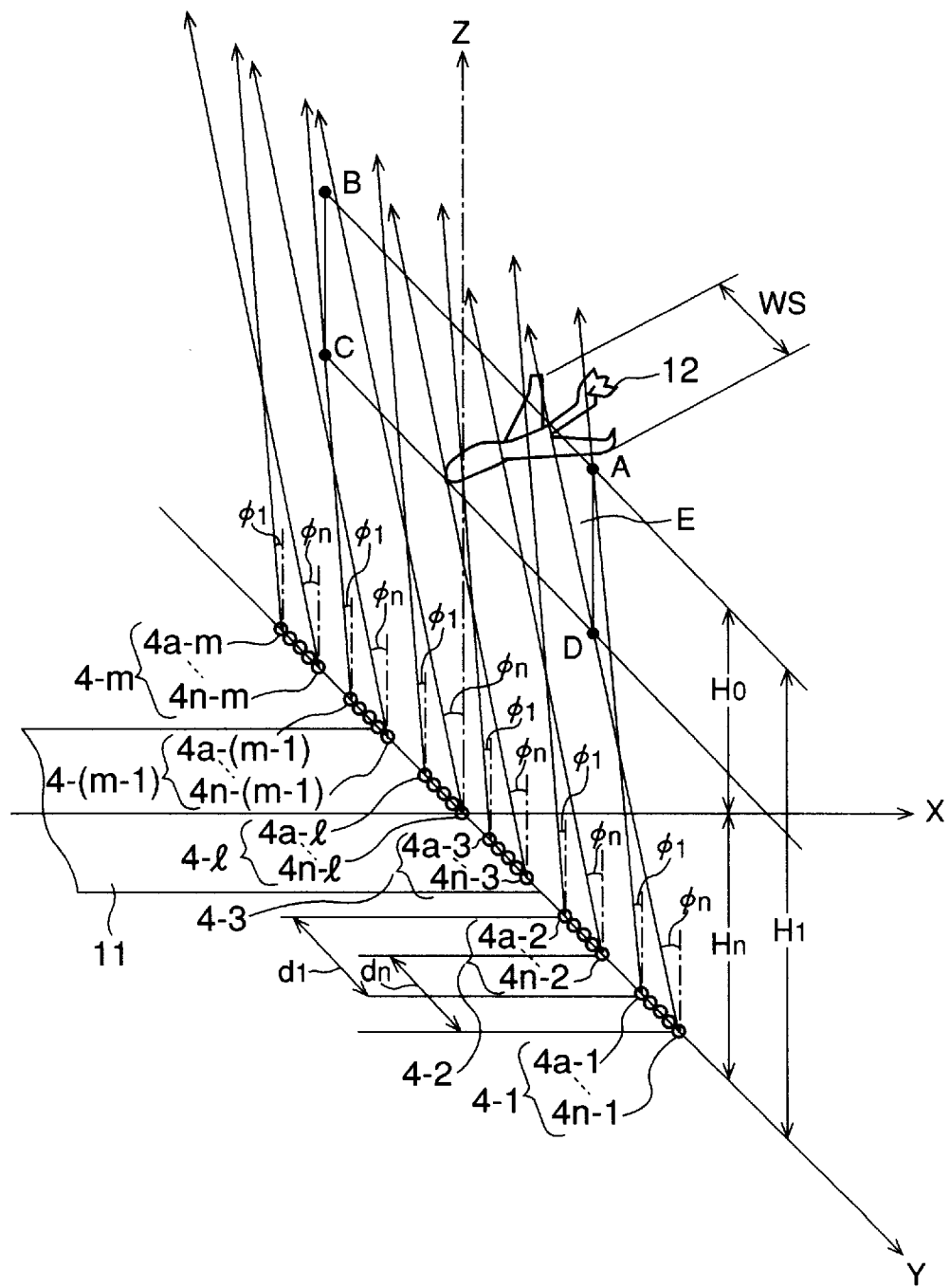
FIG. 5 is a perspective view showing arrangement of light emitting device groups according to the embodiment of the invention.

The light emitting device groups 4a to 4n of the light emitter 4 are arranged in the direction perpendicular to an extension line of the center line of a runway 11, and furthermore, are arranged at the positions computed in advance so that they may have light emitting angles of ø1 to øn for a range from the upper limit A-B (line segment AB) to the lower limit C-D (line segment CD) of the monitoring space E. Here, as shown in FIG. 3, plural light emitting devices 4a-i (i=1, 2, . . . , m-1, m) are arranged at the positions computed in advance so that they may have a light emitting angle of ø1 for the upper limit A-B of the monitoring space E. And, as shown in FIG. 4, plural light emitting devices 4n-i are arranged at the positions computed in advance so that they may have a light emitting angle of øn for the lower limit C-D of the monitoring space E. And, as shown in FIGS. 5 and 6, a light emitting device group 4-i of the light emitter 4 has a light emitting array module structure in which light emitting devices 4a-i to 4n-i are arranged in the shape of an array. That is to say, the light emitting device 4a-i is set in advance so that its optical axis may make a light emitting angle ø1, and the light emitting device 4n-i is set in advance so that its optical axis may make a light emitting angle øn. The light emitting angle ø1 is an angle set in order to electronically scan the upper limit A-B of the monitoring space E and the light emitting angle øn is an angle set in order to electronically scan the lower limit C-D of the monitoring space E. Light emitting device groups 4-i of a module structure are arranged on the surface of the ground at proper intervals in the direction perpendicular to the center line of the runway 11. For example, the light emitting device groups 4-i are embedded in the end part of the runway 11, namely, in a threshold.

Although it is ideally desirable that an interval d1 in the Y-axis direction between the light emitting devices 4a-i arranged in the plural light emitting device groups 4-i is zero, actually it will do that the interval is about one-tenth of the wing width WS of the minimum aircraft to be detected in the monitoring space E. The interval d1 between the plural light emitting devices 4*a-i* is represented by the following expression;

d1=H1×tan ø1, where H1 is the maximum height of the monitoring space E, namely, the upper limit of height.

In the same way, although it is ideally desirable that an interval dn in the Y-axis direction between the light emitting devices 4*n-i* arranged in plural light emitting device groups 4-*i* is zero, actually it will do that the interval is about one-tenth of the wing width WS of the minimum aircraft to be detected in the monitoring space E. The interval dn between the plural light emitting devices 4*n-i* is represented by the following expression;

dn=Hn×tan øn, where Hn is the minimum height of the monitoring space E, namely, the lower limit of height.

And although it is ideally desirable that an interval __d in the Y-axis direction between the light emitting devices in a light emitting device group 4-*i*, for example, between light emitting devices 4*a*-1 and 4*b*-1, between light emitting devices 4*b*-1 and 4*c*-1, . . . , or between 4(*n*-1)-1 and 4*n*-1 in the light emitting device group 4-1 is zero, actually it will do that the interval is about one-tenth of the vertical width TS of the minimum aircraft to be detected in the monitoring space E.

Plural pulse modulators 3*a* to 3*n* of the pulse modulator 3 perform an automatic control so that output of the light emitter 4 may be kept constant and generate synchronizing pulses 101*a* to 101*n*. The plural pulse modulators 3*a* to 3*n* are respectively composed of pulse modulators 3*a-i* to 3*n-i* corresponding to the respective light emitting devices 4*a-i* to 4*n-i* and the pulse modulators 3*a-i* to 3*n-i* generates, respectively, synchronizing pulses 101*a-i* to 101*n-i*.

Plural gate circuits 2*a* to 2*n* of the switcher 2 perform an on-off control of input signals to the pulse modulators 3*a* to 3*n* respectively corresponding to the gate circuits. The plural gate circuits 2*a* to 2*n* are respectively composed of gate circuits 2*a-i* to 2*n-i* respectively corresponding to the light emitting devices 4*a-i* to 4*n-i*.

The pulse generator 1 applies pulse input signals 100*a* to 100*n* which are different in frequency from one another, respectively, to the plural gate circuits 2*a* to 2*n* of the switcher 2. The gate scanning controller 8 outputs gate scanning control signals 104*a* to 104*n*, respectively, to the plural gate circuits 2*a* to 2*n* of the switcher 2, in order to electronically scan outputs toward the space from the light emitting devices 4*a-i* to 4*n-i* of the light emitter 4 over a range from the upper limit A-B to the lower limit C-D of the monitoring space E at a proper speed.

The plural light receiving device groups 5*a* to 5*n* of the light receiver 5 are arranged in the direction perpendicular to an extension line of the center line of the runway 11 as considering an acceptable inclination ±__ø1 of an aircraft 12 in advance so as to effectively receive the diffuse reflected lights 103*a* to 103*n* from the aircraft 12 passing the monitoring space E. The plural light receiving device groups 5*a* to 5*n* are, respectively, composed of the light receiving devices 5*a-i* to 5*n-i*, respectively, corresponding to the light emitting devices 4*a-i* to 4*n-i*.

The plural light receivers 6*a* to 6*n* of the light receiver 4 obtain digital outputs by performing a current-voltage conversion of outputs from the plural light receiving device groups 5*a* to 5*n* and then performing amplification, filter-separation, rectification, waveform shaping, and comparison of those converted signals. The plural light receivers 6*a* to 6*n* are, respectively, composed of the light receivers 6*a-i* to 6*n-i*, respectively, corresponding to the light receiving devices 5*a-i* to 5*n-i*.

The plural OR gate circuits 7*a* to 7*n* of the detector 7 output detection signals 105*a* to 105*n* for showing that the aircraft 12 has passed the monitoring space E to the transmitter 9 when at least one of outputs of the plural light receivers 6*a* to 6*n* has been changed.

The transmitter 9 transmits a monitoring space E passing information on the basis of the detection signals 105*a* to 105*n*, respectively, from the plural OR gate circuits 7*a* to 7*n* to the aircraft 12 through the antenna 10.

Next, a monitoring space passing detecting method using an apparatus of this embodiment as shown in FIGS. 3 to 6 is described in the following.

First, the pulse generator 1 generates pulse input signals 100*a* to 100*n* different in frequency from one another, and outputs the pulse input signals 100*a* to 100*n*, respectively, to the plural gate circuits 2*a* to 2*n*. The plural gate circuits 2*a* to 2*n* are controlled by the gate scanning control signals 104*a* to 104*n* from the gate scanning controller 8 in order to scan the monitoring space E from its upper limit A-B to its lower limit C-D at proper stepping intervals computed in advance from the size of the aircraft 12. That is to say, the plural gate circuits 2*a* to 2*n* are controlled by the gate scanning control signals 104*a* to 104*n* from the gate scanning controller 8 so as to output the pulse input signals 100*a* to 100*n* from the pulse generator 1, respectively, to the plural pulse modulators 3*a* to 3*n* at proper stepping intervals.

The plural pulse modulators 3*a* to 3*n* pulse-drive the plural light emitting device groups 4*a* to 4*n* corresponding to them with the pulse input signals from the pulse generator 1 inputted from the plural gate circuits 2*a* to 2*n* at proper stepping intervals, and send out the synchronizing pulses 101*a* to 101*n* to the plural corresponding light receivers 6*a* to 6*n*. Thus, the light emitting devices having the same light emitting angle as each other included, respectively, in the plural light emitting device groups 4*a* to 4*n* are controlled so as to emit light at the same time, and the light emitting devices having different light emitting angles from each other included, respectively, in the plural respective light emitting device groups 4*a* to 4*n* are controlled so as to emit light one after another.

An erroneous operation caused by an external disturbing light can be prevented by controlling the pulse modulators and the optical receivers so that only a pulse modulator and an optical receiver which are paired with each other can be operated, namely, for example, only a pair of the pulse modulator 3*a* and the optical receiver 6*a*, a pair of the pulse modulator 3*b* and the optical receiver 6*b*, . . . , and a pair of the pulse modulator 3*n* and the optical receiver 6*n* can be operated.

Outputs of the plural pulse modulators 3*a* to 3*n* are emitted into the monitoring space E over a range from the upper limit A-B to the lower limit C-D at a proper scanning speed and in proper scanning steps, respectively, through the light emitting device groups 4*a* to 4*n*.

The plural light emitting device groups 4*a* to 4*n* and the plural light receiving device groups 5*a* to 5*n* are arranged in the direction perpendicular to an extension line of the center line of the runway 11, and are arranged at the positions computed in advance so that the light emitting angles from the plural light emitting device groups 4*a* to 4*n* and the incident angles and the reflection angles on the aircraft 12 may be, respectively, ø1 to øn. As shown in FIG. 3, for example, when the aircraft 12 comes to the upper limit A-B of the monitoring space E, one of pulse-modulated lights 102*a* from the light emitting device group 4*a*, namely, one of pulse-modulated lights 102*a*-1 to 102*a*-*m* is reflected on the aircraft 12 and the reflected light 103*a* is received by the corresponding light receiving device group 5a. Output of this light receiving device group 5a is inputted into the corresponding optical receiver 6a. In the same way, as shown in FIG. 4, for example, when the aircraft 12 comes to the lower limit C-D of the monitoring space E, one of pulse-modulated lights 102n from the light emitting device group 4n, namely, one of pulse-modulated lights 102n-1 to 102n-m is reflected on the aircraft 12 and the reflected light 103n is received by the corresponding light receiving device group 5n. Output of this light receiving device group 5n is inputted into the corresponding optical receiver 6n. In this way, outputs of the plural optical receivers 6a to 6n are inputted into the OR gate circuits 7a to 7n, and detection signals 105a to 105n showing that the aircraft 12 has passed the monitoring space can be obtained.

Next, relation between an acceptable inclination of an aircraft and a monitoring space passing detecting operation in a monitoring space passing detecting apparatus of this embodiment is described with reference to FIGS. 7A to 7C.

Figure 7A:
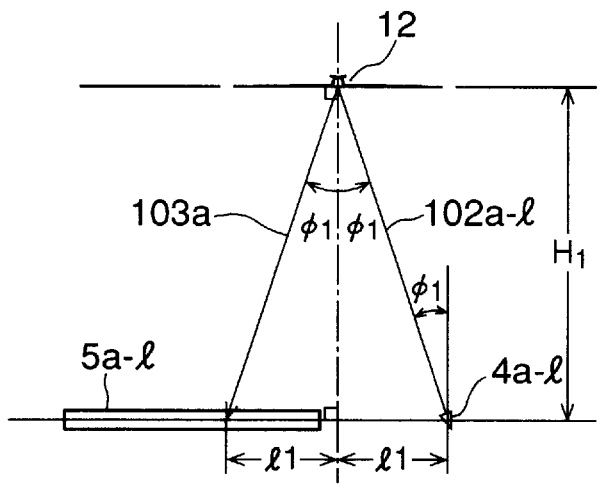
FIG. 7A is a figure showing a detecting operation of the embodiment of the invention for detecting that an aircraft has passed a monitoring space in case that the aircraft is at a level.

Referring to FIG. 7A, in case that the aircraft 12 is at a level, the pulse-modulated light 102a-1 emitted at a light emitting angle of ø1 from the light emitting device 4a-1 is hit on the aircraft 12 at an incident angle of ø1 and is reflected on the aircraft 12 at a reflection angle of ø1. The reflected light 103a from the aircraft 12 is received by the light receiving device 5a-1 near a point at a distance 11 from the intersecting point of the vertical axis of the aircraft 12 and the runway 11.

Figure 7B:
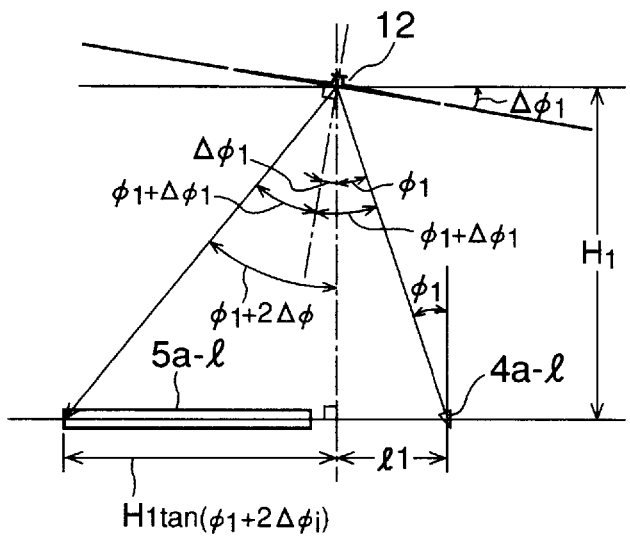
FIG. 7B is a figure showing a detecting operation of the embodiment of the invention for detecting that an aircraft has passed a monitoring space in case that the aircraft is inclined to the negative direction.

Referring to FIG. 7B, in case that the aircraft 12 is inclined by an angle of _ø1 in the negative direction, the pulse-modulated light 102a-1 emitted at a light emitting angle of ø1 from the light emitting device 4a-1 is hit on the aircraft 12 at an incident angle of "ø1+_ø1" and is reflected on the aircraft at a reflection angle of "ø1+_ø1". The reflected light 103a from the aircraft 12 is received by the light receiving device 5a-1 near a point at a distance of H1×tan(ø1+2_ø1) from the intersecting point of the vertical axis of the aircraft 12 and the runway 11.

Figure 7C:
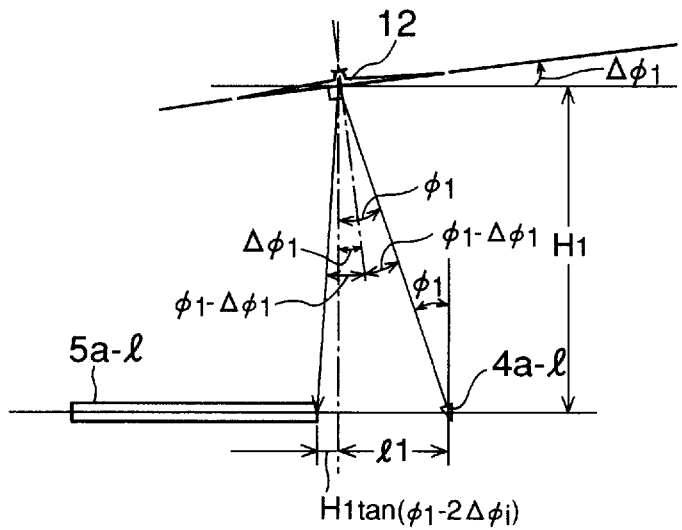
FIG. 7C is a figure showing a detecting operation of the embodiment of the invention for detecting that an aircraft has passed a monitoring space in case that the aircraft is inclined to the positive direction.

Referring to FIG. 7C, in case that the aircraft 12 is inclined by an angle of _ø1 in the positive direction, the pulse-modulated light 102a-1 emitted at a light emitting angle of ø1 from the light emitting device 4a-1 is hit on the aircraft 12 at an incident angle of "ø1-_ø1" and is reflected on the aircraft at a reflection angle of "ø1-_ø1". The reflected light 103a from the aircraft 12 is received by the light receiving device 5a-1 near a point at a distance of H1×tan(ø1-2_ø1) from the intersecting point of the vertical axis of the aircraft 12 and the runway 11.

Hereupon, an acceptable inclination of the aircraft 12 is prescribed to be within ±20 degrees in the standards and the flight inspection rules of ICAO Annex 10.

Next, a pulse modulator in a monitoring space passing detecting apparatus of this embodiment is described with reference to FIG. 8.

Figure 8:
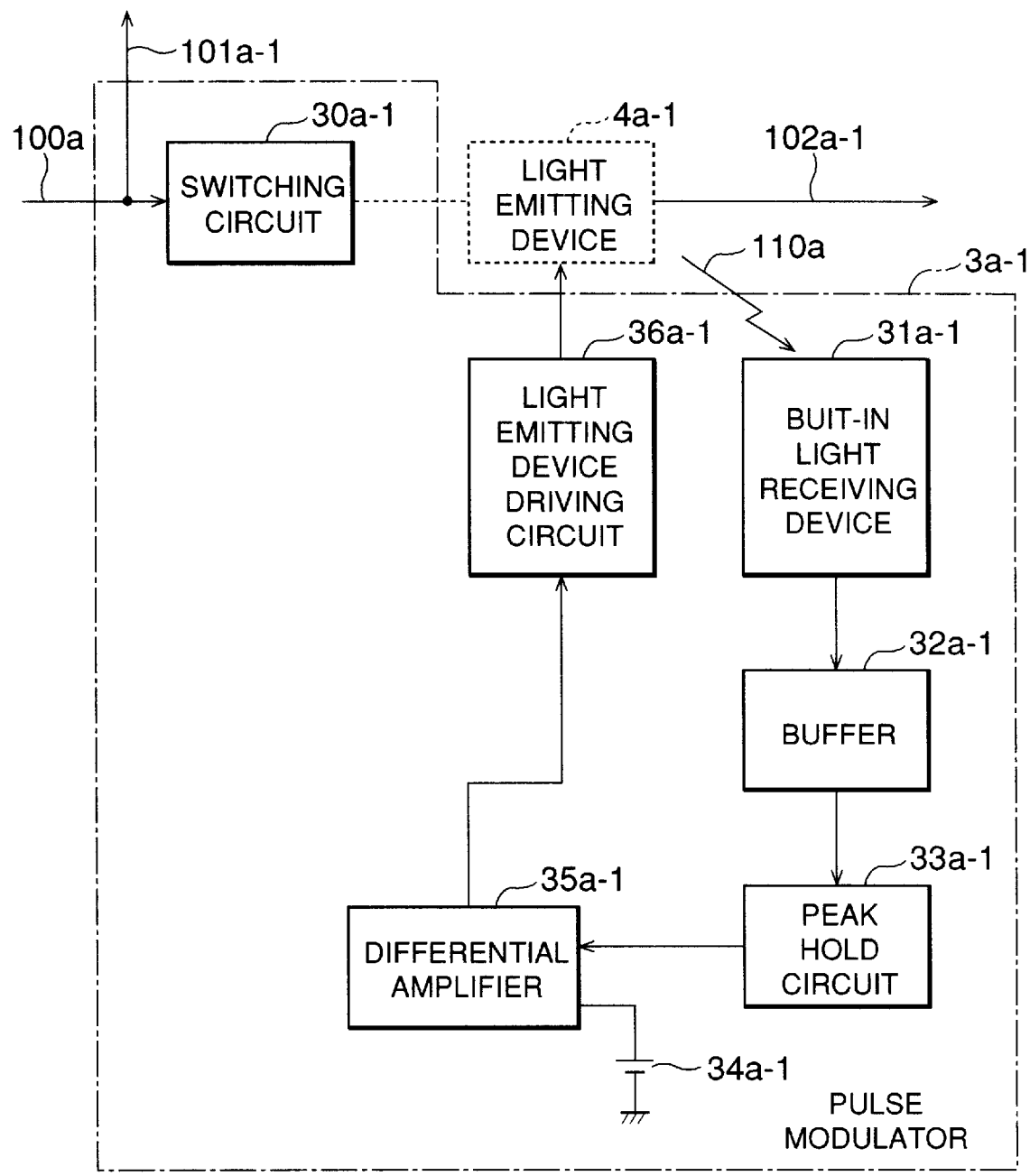
FIG. 8 is a block diagram showing composition of a pulse modulator in FIG. 3.

Referring to FIG. 8, the pulse modulator 3a-1 is provided with a switching circuit 30a-1, a built-in light receiving device 31a-1, a buffer 32a-1, a peak hold circuit 33a-1, a reference voltage 34a-1, a differential amplifier 35a-1, and a light emitting device driving circuit 36a-1.

A pulse input signal 100a supplied from the pulse generator 1 through the gate circuit 2a-1 is inputted into the switching circuit 30a-1 for the light emitting device 4a-1 composed of a laser diode or the like. The switching circuit 30a-1 turns on or off the light emitting device 4a-1 according to the inputted pulse input signal 100a. After the built-in light receiving device 31a-1 photoelectrically converts a signal outputted from the light emitting device 4a-1 as a light signal into an electric signal, the peak hold circuit 33a-1 holds a peak level obtained through the buffer 32a-1 when the light emitting device 4a-1 is on.

The differential amplifier 35a-1 takes in the peak level held by the peak hold circuit 33a-1 and a reference voltage 34a-1 set in advance as input and outputs a differential output of them as an input signal to the light emitting device driving circuit 36a-1.

By having the above-mentioned circuit composition, the system is always given a feedback when the light emitting device groups 4a to 4n are turned on and so the emitted lights from the light emitting device groups 4a to 4n are stabilized in level. The other pulse modulators 3a-2 to 3a-m, . . . , 3n-1 to 3n-m have also the same composition as the said pulse modulator 3a-1, and operate in the same way as the pulse modulator 3a-1.

Next, an optical receiver in a monitoring space passing detecting apparatus of this embodiment is described with reference to FIG. 9.

Figure 9:
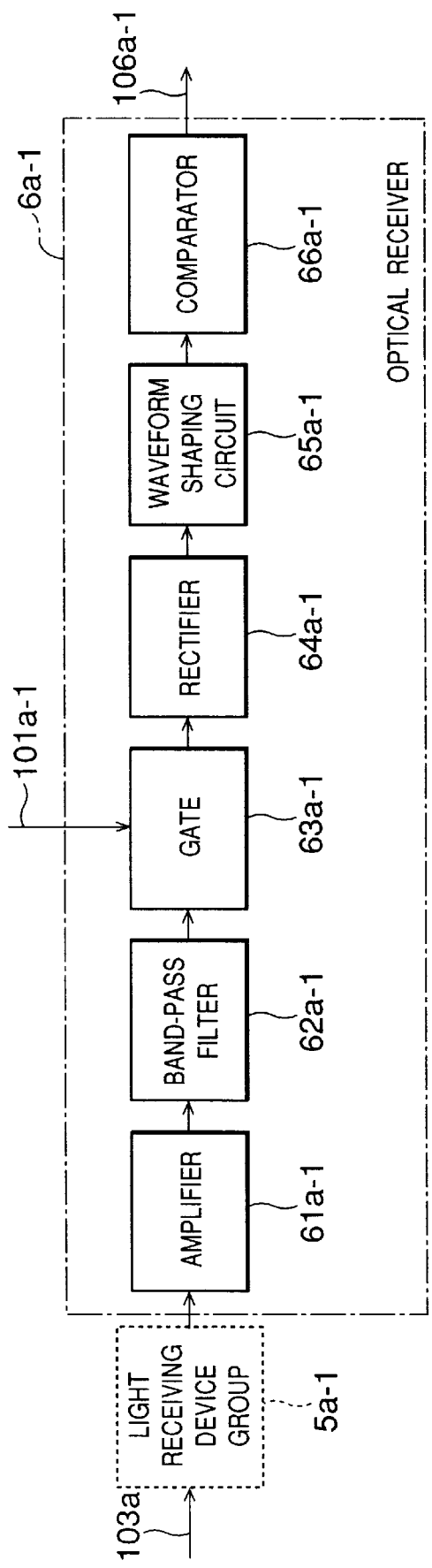
FIG. 9 is a block diagram showing composition of an optical receiver in FIG. 3.

Referring to FIG. 9, the optical receiver 6a-1 is provided with an amplifier 61a-1, a band-pass filter 62a-1, a gate 63-1a, a rectifier 64a-1, a waveform shaping circuit 65a-1, and a comparator 66a-1.

The optical receiver 6a-1 performs a current-voltage conversion of output from the light receiving device 5a-1, amplifies the converted signal up to a necessary level by means of the amplifier 61a-1, and then performs a frequency-separation of the amplified signal by means of the band-pass filter 62a-1. The gate 63a-1 outputs the signal separated in frequency by the band-pass filter 62a-1 to the rectifier 64a-1, synchronously with the synchronizing pulse 101a-1 inputted from the pulse modulator 3a-1.

A signal outputted from the gate 63a-1 is full-wave-rectified by the rectifier 64a-1, is waveform-shaped by the waveform shaping circuit 65a-1, and then is converted into a digital output 106a-1 by the comparator 66a-1.

The other optical receivers 6a-2 to 6a-m, . . . , 6n-1 to 6n-m have also the same composition as the said optical receiver 6a-1, and operate in the same way as the said optical receiver 6a-1.

Next, a monitoring space passing detecting apparatus, particularly an example of a monitoring space set according to another embodiment of the invention is described with reference to FIG. 10.

Figure 10:
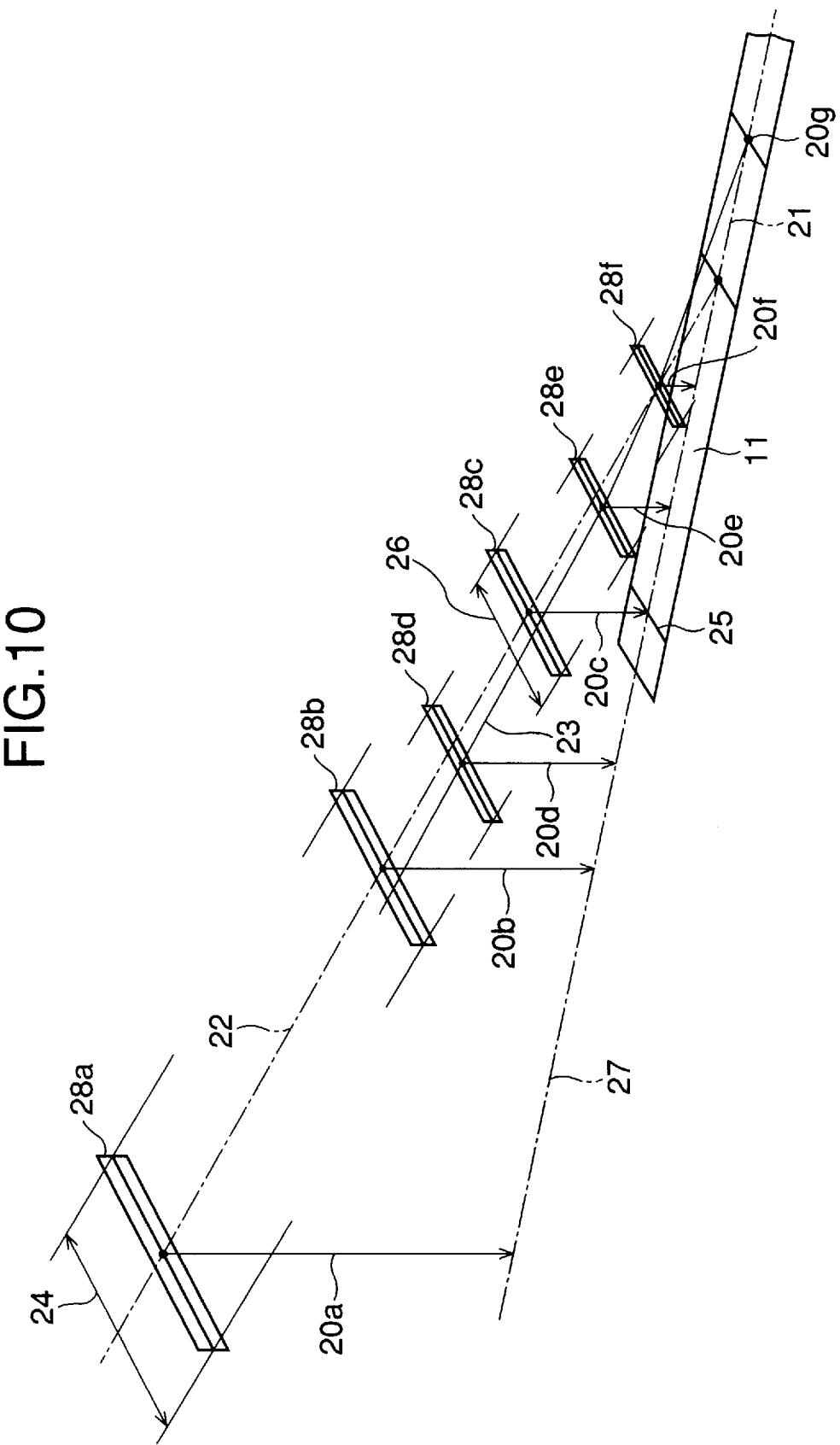
FIG. 10 is a figure showing an example of a monitoring space set by a monitoring space passing detecting apparatus according to another embodiment of the invention.

Referring to FIG. 10, both of a glide pass 22 and an ideal trajectory 23 of the wheels are shown on the final approach path. A decision height of category I (=60 m) 20a necessary for approach and landing according to the existing ILS or MLS, a decision height of category II (=30 m) 20b, and a reference datum (=15 m+3 to −0 m) 20c are shown on the glide path 22.

Here, the decision height means the lowest height up to which an aircraft can descend by an instrument flight in case of performing a precise approach, namely, the lowest height required for obtaining an instruction necessary for continuing the final approach. The decision height of category I means that this lowest height is equal to or higher than 60 m (200 ft), and the decision height of category II means that this lowest height is equal to or higher than 30 m (100 ft) and lower than 60 m (200 ft).

In case of the decision height of category I, a pilot must visually recognize the runway 11 at a height of 60 m (200 ft) or higher from the runway 11, and if the pilot cannot visually recognize it, the pilot gives up the landing. In case of the decision height of category II, a pilot must visually recognize the runway 11 at a height which is equal to or higher than 30 m (100 ft) and lower than 60 m (200 ft) from the runway 11, and if the pilot cannot visually recognize it, the pilot gives up the landing.

The ideal trajectory 23 of the wheels shows a trajectory in an instrument landing of an existing jet plane, and a flare-out decision height (=22.5 m) 20d, a flare-out starting height (=9 m) 20e, a decrab starting height (=6 m) 20f, and a main gear landing point 20g are shown on the trajectory 23.

A monitoring space passing detecting apparatus according to this embodiment sets monitoring spaces 28a to 28f, respectively, for the above-mentioned heights, and monitoring space passing detecting apparatuses as described above are arranged, respectively, for those monitoring spaces 28a to 28f. The reference number 27 shows an extension line of the center line 21 of the runway 11.

Here the horizontal width of the monitoring space 28a at the decision height of category I is set at a course width 24 of a localizer prescribed in the existing ILS, and the vertical width of the monitoring space 28c at the reference datum 20c is set at "15 m+3 to –0 m". The horizontal width 26 of the monitoring space 28c is 210 m (700 ft). The horizontal widths of the monitoring spaces 28d and 28f in relation to another fare-out guidance are set so as to be matched with the course width 24, and the vertical widths of the monitoring spaces 28d and 28f are set at a proper width.

In FIG. 10, although an example where the monitoring spaces 28a to 28f are intermittently arranged at the main positions on the final approach path, if the monitoring spaces are continuously arranged at the consecutive positions including the main positions on the final approach path, it is possible to continuously monitor an aircraft 12 passing the monitoring spaces.

In such a way, the plural light emitting device groups 4a to 4n and the plural light receiving device groups 5a to 5n, respectively, corresponding to the groups 4a to 4n are arranged in the positions computed in advance in the direction perpendicular to the extension line 27 of the center line 21 of the runway 11 so that the light emitting angles of the plural light emitting device groups 4a to 4n and the incident angles of lights to the aircraft 12 and the angles of reflection from the aircraft 12 may be, respectively, $\phi 1$ to $\phi n$. The plural optical receivers 6a to 6n, respectively, corresponding to the plural light receiving device groups 5a to 5n take in outputs of the plural light receiving device groups 5a to 5n as input, and output digital signals to the OR gate circuits 7a to 7n, respectively, corresponding to the plural optical receivers 6a to 6n. When at least one of outputs of the plural optical receivers 6a to 6n is changed, detection signals 105a to 105n to show that an aircraft 12 has passed a monitoring space are outputted to the transmitter 9 from the plural OR gate circuits 7a to 7n, respectively, corresponding to the plural light receiving device groups 5a to 5n. By transmitting a monitoring space passing information on the basis of these detection signals 105 to 105n from the transmitter 9 to the aircraft 12, it is possible to form the monitoring spaces 28a to 28f including the main positions such as the lowest approach heights (decision heights: a decision height of category I 20a and a decision height of category II 20b), a reference datum 20c, a flare-out height, and a decrab height intermittently or consecutively on the landing approach path, to detect in an instant an aircraft 12 passing the monitoring spaces 28a to 28f, and to transmit the passing information to the aircraft 12.

Thanks to that it is possible to form the monitoring spaces 28a to 28f including the main positions intermittently or consecutively on the landing approach path, it is possible to transmit in an instant a monitoring space passing information to the aircraft 12, compensate for accuracy of a three-dimensional measurement by a GPS with that information, and perform a high-category approach by the GPS under a bad weather.

In this case, since the plural light emitting device groups 4a to 4n and the plural light receiving device groups 5a to 5n which are paired with each other are, respectively, driven synchronously with each other and each of the pairs of the plural light emitting devices 4a-i to 4n-i which have the same light emitting angle as each other among the light emitting angles $\phi 1$ to $\phi n$ uses a pulse-modulated light different in frequency from the other pairs, they are little influenced by an external disturbing light.

And since the reflected lights 103a to 103n given by that the pulse-modulated lights 102a to 102n emitted from the plural light emitting device groups 4a to 4n are reflected on the aircraft 12 are detected on the basis of whether or not there is an input signal into the plural light receiving device groups 5a to 5n which are arranged in the direction perpendicular to the extension line 27 of the center line 21 of the runway 11 so that each of them may be symmetrical to and may be paired with one of the plural light emitting device groups 4a to 4n, a vertical structure is unnecessary and it is possible to easily satisfy various prescriptions for a landing zone, an approach surface, a transition surface and the like which are prescribed in the ICAO Annex 10.

Furthermore, by applying a monitoring space passing detecting apparatus of the invention combined with a GPS to a landing guidance system for an aircraft, it is possible to compensate for accuracy of a three-dimensional measurement by the GPS with the passing information and perform a high-category approach by the GPS under a bad weather.

What is claimed is:

1. An apparatus for detecting that a flying object has passed a monitoring space, comprising:

plural light emitting device groups including plural light emitting devices which are arranged in the direction perpendicular to the center line of a runway and whose light emitting angles are different from one another;

a first controller for controlling said plural light emitting device groups so that light emitting devices having the same light emitting angle as each other included, respectively, in said plural light emitting device groups may emit light at the same time and light emitting devices having different light emitting angles from one another included, respectively, in said plural light emitting device groups may emit light one after another;

plural light receiving device groups including plural light receiving devices which are arranged, respectively, so as to correspond to said plural light emitting devices included, respectively, in said plural light emitting device groups and which receive the reflected lights by reflection of the lights emitted from said plural light emitting devices on a flying object passing a monitoring space set in advance;

a second controller for controlling said plural light receiving device groups so that light receiving devices which receive the reflected lights corresponding to the lights emitted from the light emitting devices having the same light emitting angle as each other may be operated at the same time and light receiving devices which receive the reflected lights corresponding to the lights emitted from the light emitting devices having different light emitting angles from one another may be operated one after another; and a detector for outputting a passing detection signal which shows that said flying object has passed said monitoring space when at least one of said plural light receiving devices has received the reflected light.

2. An apparatus as claimed in claim 1, further comprising;

a transmitter for transmitting said passing detection signal outputted from said detector to said flying object.

3. An apparatus as claimed in claim 1, wherein;

each of said light receiving devices included in each of said plural light receiving device groups is arranged at the positions where it receives only the reflected light given by that light emitted from a light emitting device corresponding to said light receiving device is reflected on said flying object when said flying object passes a specified position inside said monitoring space.

4. An apparatus as claimed in claim 1, wherein;

said first controller controls said plural light emitting devices so as to vertically scan said monitoring space from the upper limit height thereof to the lower limit height thereof.

5. An apparatus as claimed in claim 4, wherein;

said second controller controls said plural light receiving devices so as to receive the reflected lights from said flying object passing said monitoring space, as corresponding to control of said light emitting devices by said first controller when vertically scanning said monitoring space from the upper limit height to the lower limit height by means of said plural light emitting devices.

6. An apparatus as claimed in claim 1, wherein;

said monitoring spaces are intermittently set in advance so as to include at least the lowest approach height on a landing approach path of said flying object.

7. An apparatus as claimed in claim 1, wherein;

said monitoring spaces are consecutively set in advance so as to include at least the lowest approach height on a landing approach path of said flying object.

8. An apparatus as claimed in claim 1, wherein;

said monitoring spaces are set so as to include the lowest approach height, a reference datum, a flare-out starting height, and a decrab starting height on a landing approach path of said flying object.

9. An apparatus as claimed in claim 1, wherein;

said plural light emitting devices are set at a predetermined interval on the surface of the ground.

10. An apparatus as claimed in claim 1, wherein;

light emitting devices having the same light emitting angle as each other included, respectively, in said plural light emitting device groups are set at intervals of about one-tenth of width of the detectable smallest flying object in the direction in which said light emitting devices are arranged.

11. An apparatus as claimed in claim 1, wherein;

said light emitting devices arranged adjacently to each other included in one of said light emitting device groups are set at intervals of about one-tenth of width of the detectable smallest flying object in the direction vertical to the ground surface.

12. An apparatus as claimed in claim 4, wherein;

said first controller comprises:

a pulse generator for outputting a pulse signal;

plural pulse modulators which are arranged, respectively, so as to correspond to plural light emitting devices and which pulse-drive said corresponding light emitting devices; and plural switchover circuits which are arranged, respectively, so as to correspond to said plural pulse modulators and which supplies said pulse signals at stepping intervals set in advance to said corresponding pulse modulators so that said plural light emitting devices may scan said monitoring space from the upper limit height to the lower limit height.

13. An apparatus as claimed in claim 12, wherein each of said pulse modulators comprises:

a switching circuit which switching-controls said corresponding light emitting device on the basis of a pulse signal outputted from said switchover circuit; and a feedback control circuit which takes in a lighting light outputted from said light emitting device as an input optical signal and controls the output level of said light emitting device on the basis of a signal level of the optical signal.

14. An apparatus as claimed in claim 12, wherein said second controller comprises;

plural optical receivers which are arranged, respectively, corresponding to said plural pulse modulators and perform a current-voltage conversion of outputs from said corresponding light receiving devices synchronously with pulse signals outputted from said pulse modulators, and then output digital signals, and an OR gate circuit for detecting that said flying object has passed said monitoring space according to at least one of outputs from said plural optical receivers.

15. An apparatus as claimed in claim 14, wherein said optical receiver comprises:

an amplifier which performs a current-voltage conversion of output from said corresponding light receiving device and then amplifies a signal level of the converted signal up to a desired level;

a band-pass filter for separating in frequency the signal amplified by said amplifier;

a gate circuit for outputting a signal outputted from said band-pass filter synchronously with a pulse signal outputted from said corresponding pulse modulator;

a rectifying circuit for full-wave rectifying a signal outputted from said gate circuit;

a waveform shaping circuit for shaping waveform of the signal full-wave rectified by said rectifying circuit; and a converting circuit for converting the waveform-shaped signal into a digital signal and outputting it.

* * * * *